United States Patent
Kung

(10) Patent No.: US 9,007,035 B2
(45) Date of Patent: Apr. 14, 2015

(54) CHARGE CONTROL CIRCUIT

(75) Inventor: Nien-Hui Kung, Hsinchu (TW)

(73) Assignee: Richtek Technology Corporation, Hsin-Chu (TW)

( * ) Notice: Subject to any disclaimer, the term of this patent is extended or adjusted under 35 U.S.C. 154(b) by 390 days.

(21) Appl. No.: 13/525,250

(22) Filed: Jun. 15, 2012

(65) Prior Publication Data

US 2013/0335006 A1     Dec. 19, 2013

(51) Int. Cl.
*H02J 7/06* (2006.01)
*H02J 7/24* (2006.01)
*H02J 7/00* (2006.01)

(52) U.S. Cl.
CPC ............. *H02J 7/0068* (2013.01); *H02J 7/0077* (2013.01)

(58) Field of Classification Search
USPC .................................................. 320/148, 164
See application file for complete search history.

(56) References Cited

U.S. PATENT DOCUMENTS

| 7,710,079 B2 | 5/2010 | Martin et al. | |
| 2010/0264882 A1* | 10/2010 | Hartular et al. | 320/139 |

\* cited by examiner

*Primary Examiner* — Eric Lee
(74) *Attorney, Agent, or Firm* — Tung & Associates

(57) ABSTRACT

A charge control circuit supplies power from an external power source to a first common node and charges a second common node. A regulator circuit is coupled between the external power source and the first common node, and a transistor is coupled between the first common node and the second common node. A current sensing and control device senses the current from the first common node to the second common node and generates a first control signal. A first voltage sensing and control device senses a voltage at the first common node, and generates a conduction control signal to control the transistor. A second voltage sensing and control device senses a voltage at the second common node, and generates a second control signal. The regulator circuit provides system power to the first common node according to the first control signal and the second control signal.

9 Claims, 3 Drawing Sheets

CHARGE CONTROL CIRCUIT

BACKGROUND OF THE INVENTION

1. Field of Invention

The present invention relates to a charge control circuit, which is capable of supplying power to a system while simultaneously charging a battery. The voltage at a supply terminal is feedback controlled according to the voltage and current sensed at a charging terminal, and the conduction status of a transistor between the supply terminal and the charging terminal is controlled according to the voltage sensed at the supply terminal.

2. Description of Related Art

Rechargeable battery is widely used in various portable electronic devices such as: tablet computer, smart phone, etc. Because the battery is charged while power is being supplied to the system, it is required for the relation among an external power source, a system input voltage, and the battery voltage to meet certain requirement. That is, when the external power source supplies power to the system and charges the battery, current should not flow back from the battery to the system, otherwise the battery will lose electricity and can not be fully charged. Usually, it is designed such that there is a minimum voltage difference between the battery voltage and the system input voltage when the battery is being charged, and this voltage difference is predetermined during circuit design.

Refer to FIG. 1, which shows the relation between the voltage at the charging terminal Vbat (to battery) and the voltage at the supply terminal Vsys (to system), when an external power source Vin supplies power to them. A voltage difference Vos is predetermined to keep a margin between the charging terminal Vbat and supply terminal Vsys. FIG. 2 shows a simplified schematic diagram according to prior art U.S. Pat. No. 7,710,079 which implements the relation shown in FIG. 1. As shown in FIG. 2, a charge control circuit 100 includes a regulator 101, a charge control unit 102, an error amplifier 103, an internal voltage source 104, a transistor Q100, a supply terminal Vsys, and a charging terminal Vbat. The regulator 101 is coupled to an external power source Vin and supplies power to a common node N101. The transistor Q100 is coupled between the common node N101 and a common node N102. The charge control unit 102 is coupled to the gate G100 of the transistor Q100. The internal voltage source 104 is coupled between the common node N102 and the error amplifier 103 to provide a voltage difference Vos in between. The error amplifier 103 includes a negative input terminal and two positive input terminals, wherein the negative terminal is coupled to the common node N101, and two positive terminals are respectively coupled to the internal voltage source 104 and a reference voltage Vref; the reference voltage Vref can be set in correspondence to the voltage 3.4V shown in FIG. 1. When the charge control circuit 100 is in the charge phase I of FIG. 1, the sum of the voltage at the charging terminal Vbat and the voltage difference Vos is less than the reference voltage Vref ((Vbat+Vos)<Vref), so the error amplifier 103 compares the voltage at the supply terminal Vsys and the reference voltage Vref to generate a control signal, which regulates the power supplied from the regulator 101 at 3.4V. When the charge control circuit 100 is in the charge phase II, that is, the sum of the voltage at charging terminal Vbat and the voltage difference Vos is larger than the reference voltage Vref ((Vbat+Vos)>Vref), the error amplifier 103 compares the voltage at the supply terminal Vsys and the voltage at the other positive input terminal (Vbat+Vos, the sum of the voltage at the charging terminal Vbat and the voltage difference Vos) to generate a control signal, which regulates the power supplied from the regulator 101 to maintain a predetermined voltage difference Vos between the supply terminal Vsys and the charging terminal Vbat.

The foregoing circuit design has a drawback that the voltage difference provided by the internal voltage source is a fixed predetermined value. In practical circuit operation, it suffices as long as the voltage difference can keep the voltage at the charging terminal to be lower than the voltage at the the supply terminal so that no current will flow from the battery back to the system. However, the predetermined value of the voltage difference is often larger than required, because the parameters are often set by a conservative point of view in circuit design. In other words, the fixed predetermined value is not the optimal value and may cause unnecessary power consumption.

SUMMARY OF THE INVENTION

The present invention provides a charge control circuit which has a better charging performance because of reduces power loss.

The other purposes and benefits of the present invention can be better understood from the detailed description below.

The present invention provides a charge control circuit for supplying power from an external power source to a first common node and charging a second common node from the first common node. A regulator circuit is coupled between the external power source and the first common node, and a transistor is coupled between the first common node and the second common node. The charge control circuit includes a current sensing and control device, a first voltage sensing and control device, and a second voltage sensing and control device. The current sensing and control device senses the current from the first common node to the second common node and generates a first control signal which is sent to the regulator circuit. The first voltage sensing and control device senses a voltage at the first common node, and generates a conduction control signal to control a conduction status of the transistor. The second voltage sensing and control device senses a voltage at the second common node, and generates a second control signal which is sent to the regulator circuit. The regulator circuit provides system power to the first common node according to the first control signal and the second control signal.

In a preferable embodiment of the present invention, the regulator circuit is a switching regulator.

In a preferable embodiment of the present invention, the current sensing and control device includes a current sensing device and a first amplifier. The current sensing device senses the current from the first common node to the second common node and generates a current sensing signal. The first amplifier generates the first control signal according to the current sensing signal and a first reference signal.

In a preferable embodiment of the present invention, the first voltage sensing and control device includes a first voltage sensing device, a second amplifier, and a linear control device. The first voltage sensing device senses a voltage at the first common node and generates a first voltage sensing signal. The second amplifier generates a third control signal according to the first voltage sensing signal and a second reference signal. The linear control device determines the conduction control signal according to the third control signal. The transistor is controllable by the conduction control signal to be in one of three statuses: fully conduction status, low current status, and OFF status.

In a preferable embodiment of the present invention, the second voltage sensing and control device includes a second voltage sensing device and a third amplifier. The second voltage sensing device senses a voltage at the second common node and generates a second voltage sensing signal. The third amplifier generates the second control signal according to the second voltage sensing signal and a third reference signal.

In a preferable embodiment of the present invention, the voltage difference between first common node and second common node is not predetermined.

The objectives, technical details, features, and effects of the present invention will be better understood with regard to the detailed description of the embodiments below, with reference to the drawings.

DESCRIPTION OF THE PREFERRED EMBODIMENTS

The drawings as referred to throughout the description of the present invention are for illustration only, but not drawn according to actual scale.

Figure 1:
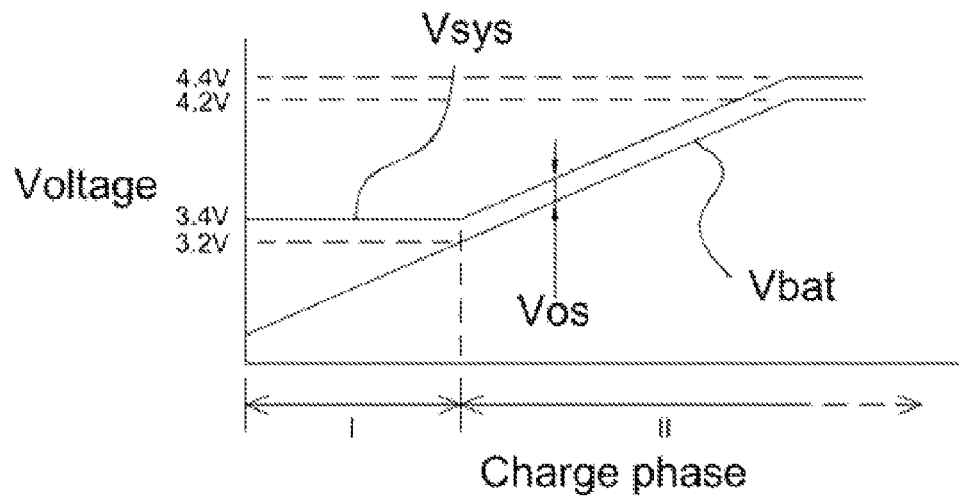
FIG. 1 shows a relation between the voltage at the charging terminal Vbat and the voltage at the supply terminal Vsys according to the prior art.
Figure 2:
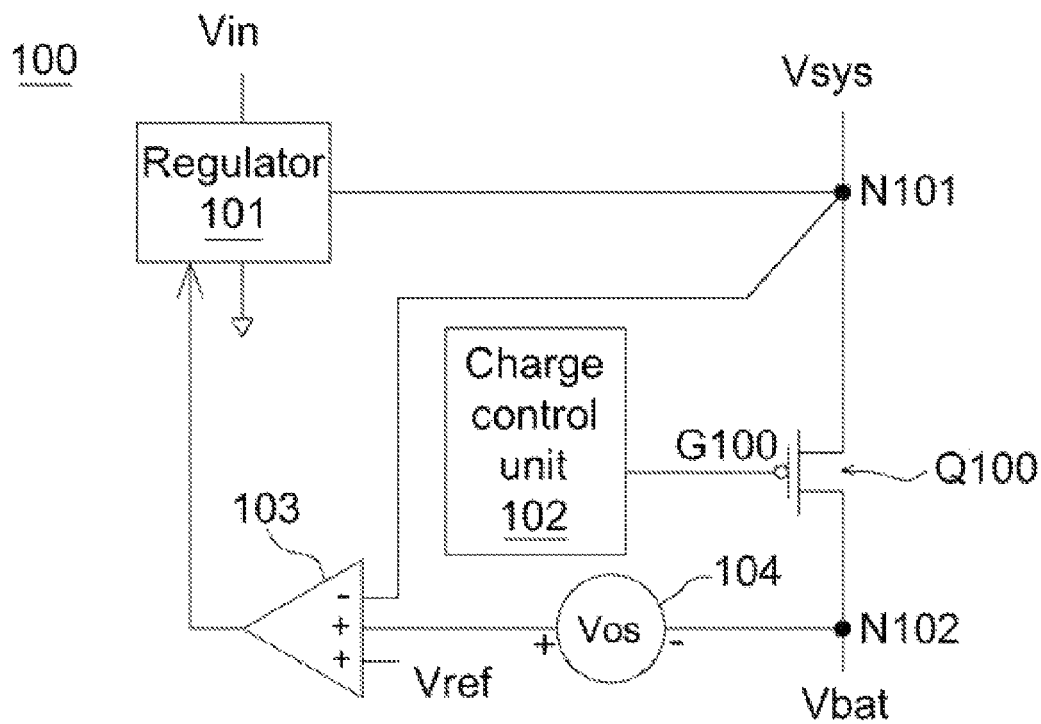
FIG. 2 shows a simplified schematic drawing of the charge control circuit according to the prior art.
Figure 3:
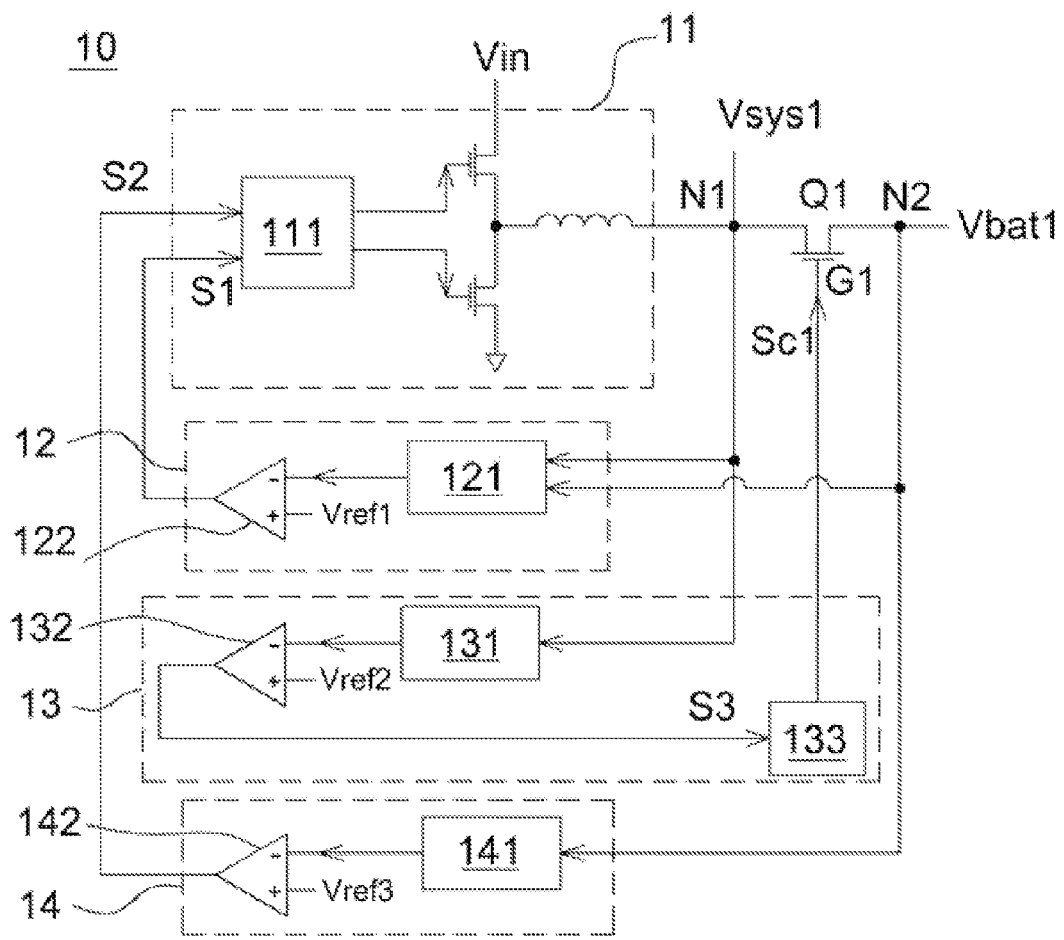
FIG. 3 shows an embodiment of the charge control circuit according to the present invention.

FIG. 3 shows an application architecture 10 where a charge control circuit according to the present invention is applied to. The application architecture 10 according to the present invention includes a regulator circuit 11, a transistor Q1, a current sensing and control device 12, a first voltage sensing and control device 13, a second voltage sensing and control device 14, a supply terminal Vsys1, and a charging terminal Vbat1. The regulator circuit 11 is coupled to an external power source Vin and provides system power to a first common node N1. The transistor Q1 is coupled between the first common node N1 and a second common node N2. The charge control circuit according to the present invention can include all circuits and devices of the above application architecture, or include part of the circuits and devices feasible to be integrated into an IC circuit, and the other parts can be located outside of the IC circuit. For example, the regulator circuit 11 can be disposed outside of the IC and the other parts are integrated inside the IC; or, the inductor of the regulator circuit 11 can be disposed outside of the IC and the rest parts are integrated inside the IC; or, the inductor, upper and lower power transistors of the regulator circuit 11 are disposed outside of the IC, and the rest parts are inside the IC; or, the inductor and the transistor Q1 are disposed outside of the IC, and the rest parts are inside the IC, etc.

Referring to FIG. 3, the current sensing and control device 12 senses the current flowing from the first common node N1 to the second common node N2, i.e., the current through the transistor Q1. The current sensing and control device 12 sends a first control signal S1 to the regulator circuit 11, which is generated according to the sensed current. The first voltage sensing and control device 13 senses a voltage at the first common node N1 and generates a conduction control signal Sc1, which is sent to the transistor Q1 to decide a conduction status of the transistor Q1. The conduction status can be one of a fully conduction status, a low current status, and an OFF status. The second voltage sensing and control device 14 senses a voltage at the second common node N2, and sends a second control signal S2 to the regulator circuit 11, which is generated according to the sensed voltage. The first common node N1 is coupled to a supply terminal Vsys1, and the supply terminal Vsys1 can be coupled to a system input voltage. The second common node N2 is coupled to a charging terminal Vbat1, and the charging terminal Vbat1 can be coupled to a battery. The regulator circuit 11 provides system power to the first common node N1 according to the first control signal S1 and the second control signal S2.

Still referring to FIG. 3, the regulator circuit 11 is for example a switching regulator that includes a pulse width modulation circuit 111, upper and lower power transistors, and an inductor. The pulse width modulation circuit 111 controls the upper and lower power transistors according to the first control signal S1 and the second control signal S2.

In this embodiment, the current sensing and control device 12 preferably includes a current sensing device 121 and a first error amplifier 122. The current sensing device 121 senses the current flowing from the first common node N1 to the second common node N2 (current through transistor Q1) and generates a current sensing signal which is sent to the first error amplifier 122. The first error amplifier 122 generate the first control signal S1 according to the current sensing signal and a first reference signal Vref1, and sends the first control signal S1 to the regulator circuit 11.

Still referring to FIG. 3, the first voltage sensing and control device 13 preferably includes a first voltage sensing device 131 and a second error amplifier 132, and optionally a linear control device 133. The first voltage sensing device 131 senses a voltage at the first common node N1 and generates a first voltage sensing signal which is sent to the second error amplifier 132. The second error amplifier 132 generates a third control signal S3 according to the first voltage sensing signal and a second reference signal Vref2. In one embodiment, the third control signal S3 is directly used to control the gate G1 of the transistor Q1. In the embodiment as shown, the third control signal S3 is sent to the linear control device 133 which generates a conduction control signal Sc1 according to the third control signal S3, to control the conduction status of the transistor Q1.

The second voltage sensing and control device 14 preferably includes a second voltage sensing device 141 and a third error amplifier 142. The second voltage sensing device 141 senses the voltage Vbat1 at the second common node N2 and generates a second voltage sensing signal. The third error amplifier 142 generates the second control signal S2 according to the second voltage sensing signal and a third reference signal Vref3, and sends the second control signal S2 to the regulator circuit 11.

The aforementioned circuit operates as below: when the second control signal S2 indicates that the voltage at charging terminal Vbat1 is lower than a predetermined voltage, or the first control signal S1 indicates that the current through the transistor Q1 is insufficient, the regulator circuit 11 will increase power supplied to the first common node N1 from external power source Vin, for example by increasing the conduction time of the upper power transistor of the regulator circuit 11 or by increasing the operation frequency thereof. Because more power is supplied from the external power source Vin to the first common node N1, the current flowing from the first common node N1 to the second common node N2 is naturally increased, and the voltage at the second common node N2 is also increased. Moreover, the transistor Q1 will naturally operate in a status having a lowest ON-resistance, that is, the voltage difference between the source and drain of the transistor Q1 is the lowest drain-to-source voltage when the transistor Q1 is fully-ON, which is one important benefit of the present invention. In detail, the voltage difference between the common node N101 and the common node N102 is Vos in the prior art, which is a fixed and non-optimal value. Comparing with the prior art, in the present invention, the voltage difference between the first common node N1 and the second common node N2 of the present invention is the lowest voltage difference between the source and drain of transistor Q1, and furthermore this is naturally attained without artificial setting. Therefore, the present invention is advantageous over the prior art.

Further, when the third control signal S3 indicates that the voltage at supply terminal Vsys1 is lower than a predetermined voltage, the conduction control signal Sc1 generated by the linear control device 133 will control the conduction status of the transistor Q1 to reduce the current flowing from the first common node N1 to the second common node N2. Thus, most of the power supplied from external power source Vin will be supplied to the first common node N1, and the voltage at the supply terminal Vsys1 will be increased.

Figure 4:
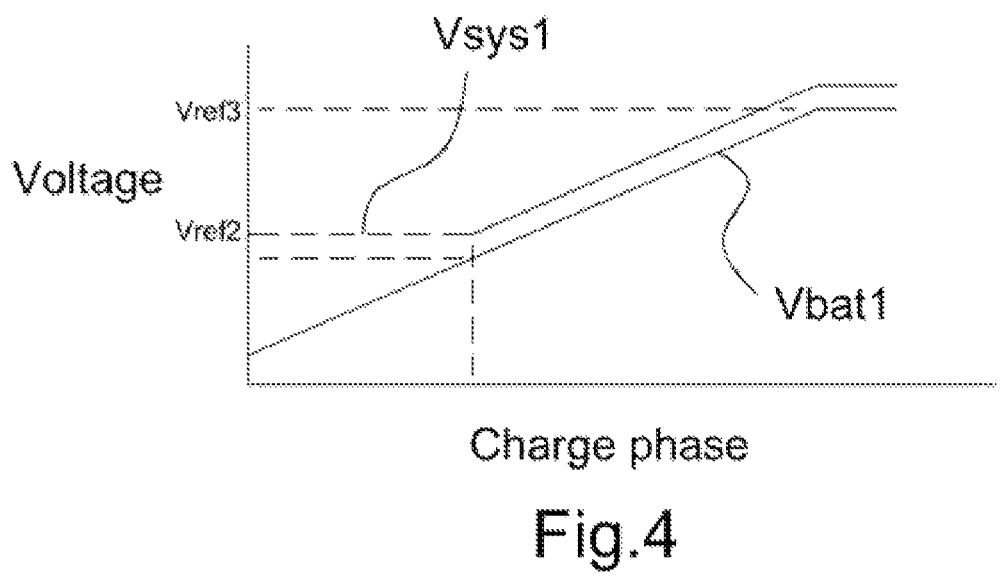
FIG. 4 shows a relation between the voltage at the first common node and the voltage at the second common node in the circuit shown in FIG. 3.

Referring to FIG. 4, a relation between the voltage at the supply terminal Vsys1 (hereinafter voltage Vsys1) and the voltage at the charging terminal Vbat1 (hereinafter voltage Vbat1) of an embodiment according to the present invention is shown. There is a horizontal line portion at the left of the voltage Vsys1 curve, which indicates that when the voltage Vbat1 is too low, the voltage Vsys1 will be regulated to the minimum voltage level required for system operation (the figure denotes this level by "Vref2", which means that this level corresponds to the second reference signal Vref2 but does not mean that this level has to be equal to the second reference signal Vref2). The large voltage difference between the voltage Vsys1 and the Vbat1 indicates that more charge current is needed for charging the battery, and the current sensing and control device 12 transmits such information by the first control signal S1 to the regulator circuit 11, for increasing the charge current to a predetermined maximum (corresponding to but not necessarily equal to the first reference signal Vref1).

Still referring to FIG. 4, there is a slope line portion in the middle of the voltage Vsys1 curve, which indicates that when voltage Vbat1 reaches the minimum voltage level for system operation, the voltage Vsys1 needs to be higher than the voltage Vbat1. By the control mechanism of the present invention as described in the above, the voltage difference between the voltage Vsys1 and the voltage Vbat1 is controlled to be the lowest drain-to-source voltage of the fully-ON transistor Q1. Therefore, the present invention is advantageous over the prior art.

The voltage Vbat1 continues increasing because it is still being charged, until the battery voltage reaches saturation status (the figure denotes this saturation level by "Vref3", which means that this level corresponds to the third reference signal Vref3 but does not mean that this level has to be equal to the third reference signal Vref3). At this point, the voltage difference between the voltage Vsys1 and voltage Vbat1 remains lowest.

In above description, it is described that the maximum battery charge current corresponds to but is not necessarily equal to the first reference signal Vref1; the minimal system input voltage corresponds to but is not necessarily equal to the second reference signal Vref2; the battery saturation voltage corresponds to but is not necessarily equal to the third reference signal Vref3. That is because, the sensed signals by the current sensing device 121, the first voltage sensing device 131, and the second voltage sensing device 141 can be proportional to the sensed targets. Therefore, the first reference signal Vref1, the second reference signal Vref2, and the third reference signal Vref3 can be proportional to but not necessarily equal to the maximum charge current, minimum system input voltage, and the battery saturation voltage.

According to the present invention, the transistor Q1 can be N-type or P-type MOS transistor, or bipolar transistor.

Besides, when the external power source Vin is not coupled to the charge control circuit and the system requires power for operation, the battery can supply power to the first common node N1 through the transistor Q1, or another path.

The present invention has been described in considerable detail with reference to certain preferred embodiments thereof. It should be understood that the description is for illustrative purpose, not for limiting the scope of the present invention. For example, the first reference signal Vref1, the second reference signal Vref2, and the third reference signal Vref3 are not necessary fixed values. For another example, if there is no upper limit fir the charge current, the first error amplifier 122 and the first reference signal can be omitted. Those skilled in this art can readily conceive variations and modifications within the spirit of the present invention. An embodiment or a claim of the present invention does not need to achieve all the objectives or advantages of the present invention. The title and abstract are provided for assisting searches but not for limiting the scope of the present invention.

What is claimed is:

1. A charge control circuit for supplying power from an external power source to a first common node and charging a second common node from the first common node, a regulator circuit being coupled between the external power source and the first common node, and a transistor being coupled between the first common node and the second common node, the charge control circuit comprising:
    a current sensing and control device, for sensing a current from the first common node to the second common node and generating a first control signal, wherein the first control signal is not transmitted to a gate of the transistor to control the transistor but is sent to the regulator circuit;
    a first voltage sensing and control device, for sensing a voltage at the first common node and generating a conduction control signal to decide a conduction status of the transistor, wherein the gate of the transistor receives the conduction control signal but does not receive the first control signal; and
    a second voltage sensing and control device, for sensing a voltage at the second common node and generating a second control signal which is sent to the regulator circuit;
    wherein the regulator circuit provides system power to the first common node according to the first control signal and the second control signal.

2. The charge control circuit of claim 1, wherein the regulator circuit is a switching regulator.

3. The charge control circuit of claim 1, wherein the current sensing and control device includes:
    a current sensing device for sensing the current from the first common node to the second common node and generating a current sensing signal, and
    a first error amplifier for generating the first control signal according to the current sensing signal and a first reference signal.

4. The charge control circuit of claim 1, wherein the first voltage sensing and control device includes:
- a first voltage sensing device for sensing a voltage at the first common node and generating a first voltage sensing signal, and
- a second error amplifier for generating a third control signal according to the first voltage sensing signal and a second reference signal.

5. The charge control circuit of claim 4, wherein the first voltage sensing and control device further includes a linear control circuit, the linear control circuit determining the conduction control signal according to the third control signal.

6. The charge control circuit of claim 1, wherein the second voltage sensing and control device includes:
- a second voltage sensing device for sensing a voltage at the second common node and generating a second voltage sensing signal, and
- a third error amplifier for generating the second control signal according to the second voltage sensing signal and a third reference signal.

7. The charge control circuit of claim 1, wherein the transistor is controllable by the conduction control signal to be in one of three statuses: fully conduction status, low current status, and OFF status.

8. The charge control circuit of claim 1, wherein the first common node is coupled to a system input voltage.

9. The charge control circuit of claim 1, wherein the second common node is coupled to a battery.

\* \* \* \* \*